United States Patent
Todeschini (10) Patent No.: US 10,498,436 B2
(45) Date of Patent: Dec. 3, 2019

(54) METHOD FOR DISTINGUISHING UPLINK AND DOWNLINK COMMUNICATIONS

(71) Applicant: SAFRAN ELECTRONICS & DEFENSE, Boulogne Billancourt (FR)

(72) Inventor: Eric Todeschini, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/336,012

(22) PCT Filed: Sep. 25, 2017

(86) PCT No.: PCT/EP2017/074246
§ 371 (c)(1),
(2) Date: Mar. 22, 2019

(87) PCT Pub. No.: WO2018/055169
PCT Pub. Date: Mar. 29, 2018

(65) Prior Publication Data
US 2019/0342002 A1 Nov. 7, 2019

(30) Foreign Application Priority Data
Sep. 26, 2016 (FR) ..................... 16 01401

(51) Int. Cl.
*H04B 7/26* (2006.01)
*H04B 7/185* (2006.01)
(Continued)

(52) U.S. Cl.
CPC ......... *H04B 7/2656* (2013.01); *B64C 39/024* (2013.01); *H04B 7/18506* (2013.01);
(Continued)

(58) Field of Classification Search
None
See application file for complete search history.

(56) References Cited

U.S. PATENT DOCUMENTS 5,509,016 A * 4/1996 Muller ................ H04B 7/2681
340/4.2
6,674,817 B1 * 1/2004 Dolle .................. H04B 7/2656
375/342
(Continued)

FOREIGN PATENT DOCUMENTS

EP    1 045 533 A1    10/2000
WO    2015/043123 A1    4/2015

OTHER PUBLICATIONS

Dec. 13, 2017 International Search Report issued in International Patent Application No. PCT/EP2017/074246.

*Primary Examiner* — Yaotang Wang
(74) *Attorney, Agent, or Firm* — Oliff PLC; R. Brian Drozd (57) ABSTRACT

Method implemented in a system comprising a control station and at least one drone. Each data communication in said system between the control station and a drone taking place in the form of packets, each packet comprising a preamble and being transmitted in a form modulated according to a predefined modulation. The method comprises: using, in each packet communication from the control station to a drone, a so-called uplink preamble, orthogonal to the so-called downlink preamble, used in each packet communication from a drone to the control station; and, on reception of a modulated packet, determining whether said modulated packet has been transmitted in the context of an uplink or downlink communication according to a result of a convolution between said modulated packet with a reference preamble modulated according to the predefined modulation, said reference preamble corresponding to the uplink preamble or to the downlink preamble.

9 Claims, 4 Drawing Sheets

(51) Int. Cl.
*H04L 5/00* (2006.01)
*H04L 25/02* (2006.01)
*H04W 72/04* (2009.01)
*B64C 39/02* (2006.01)

(52) U.S. Cl.
CPC ........ *H04L 5/0053* (2013.01); *H04L 25/0202* (2013.01); *H04W 72/0406* (2013.01); *H04W 72/0446* (2013.01); *B64C 2201/146* (2013.01)

(56) References Cited

U.S. PATENT DOCUMENTS

| | | | | |
|---|---|---|---|---|
| 2003/0026223 | A1* | 2/2003 | Eriksson | H04B 1/7143 370/335 |
| 2006/0215611 | A1* | 9/2006 | Nakagawa | H04W 72/044 370/332 |
| 2019/0222305 | A1* | 7/2019 | Wang | H04B 7/18504 |

* cited by examiner

METHOD FOR DISTINGUISHING UPLINK AND DOWNLINK COMMUNICATIONS

The invention relates to a method implemented in a pilotless mobile device system comprising a control station and at least one pilotless mobile device for distinguishing uplink communications from the control station to a pilotless mobile device and downlink communications from a pilotless mobile device to the control station.

The preservation of human beings has become a major preoccupation in many fields. Thus, in many perilous missions, human beings are replaced by pilotless mobile devices. Mention can be made for example of certain observation missions over dangerous zones such as conflict zones, construction sites at a height, or nuclear sites, performed by pilotless airborne devices referred to as drones, devices travelling on the ground, or floating or submersible devices.

Although some pilotless mobile devices are fully automatic, many of these devices are remotely controlled by one or more human beings from a control station. These pilotless mobile devices must generally transmit results of observations either to a person controlling them or to a person responsible for analysing data resulting from these observations. These data frequently comprise images and sometimes videos. It is then necessary to establish wireless communications between the pilotless mobile devices and the control station in order to provide remote control of said devices and transmission of the observation data. Such communications must be as reliable as possible in order firstly for a loss of control not to cause loss of the pilotless mobile device, which may have a very high cost, and secondly so that the observation data are as usable as possible.

So-called pilotless mobile device systems are known, comprising a plurality of pilotless mobile devices and at least one control station. In such systems, there exist so-called uplink communications, going from the control station to a pilotless mobile device, and downlink communications going from a drone to the control station. It is important for a pilotless mobile device to be able to quickly distinguish the uplink communications that may concern it, from downlink communications that emanate from another pilotless mobile device and therefore not generally concerning it. It is also important for a control station to be able to quickly distinguish the downlink communications that may concern it, from uplink communications that might emanate from another control station and therefore not concerning it.

It would be desirable to define a method and a system enabling a pilotless mobile device or a control station to quickly distinguish an uplink communication from a downlink communication. It would also be desirable for this method to have no computing cost and for the system implementing this method to be of low complexity.

According to one aspect of the present invention, the present invention relates to a method implemented in a pilotless mobile device system comprising a control station and at least one pilotless mobile device, the control station communicating with each pilotless mobile device using a medium-access technique of the time division multiple access type in which each communication takes place in frames. Each frame is divided into a plurality of timeslots, each timeslot being divided into a plurality of burst intervals, each burst interval being divided into a plurality of periods making it possible to transmit data in the form of data packets, each data packet being modulated by a predefined modulation before transmission thereof, a first period in the plurality of periods making it possible to transmit a preamble enabling a receiver of said preamble to make a channel estimation in order to perform frequency, phase and timing synchronisations and reception signal equalisation, and a second period making it possible to transmit a burst. The method comprises: using, in each uplink communication from the control station to a pilotless mobile device, a preamble, referred to as the uplink preamble, orthogonal to the preamble known as the downlink preamble used in each downlink communication from a pilotless mobile device to the control station; and, when a modulated data packet is received, determining whether said packet has been transmitted in the context of an uplink or downlink communication according to a result of a convolution between said packet with a reference preamble modulated according to the predefined modulation, said reference preamble corresponding to the uplink preamble or to the downlink preamble.

In this way, a receiver of a data packet is capable of determining whether said packet has been transmitted in the context of an uplink or downlink communication without having to demodulate said packet. The packet can then easily be rejected by the receiver if said packet does not concern said receiver. This method for discriminating packets transmitted in the context of an uplink or downlink communication therefore has a low computing cost.

According to one embodiment, when, during a convolution calculation between said packet and the downlink preamble modulated, a correlation value greater than or equal to a first predefined threshold is obtained, said packet is considered to have been transmitted in the context of a downlink communication and, when, during a convolution calculation between said packet and the uplink preamble modulated, a correlation value greater than or equal to a second predefined threshold is obtained, said packet is considered to have been transmitted in the context of an uplink communication.

According to one embodiment, when, during a convolution calculation between said packet and the downlink preamble modulated, a correlation value lower than the first predefined threshold is obtained, said packet is considered to have been transmitted in the context of a downlink communication and, when, during a convolution calculation between said packet and the uplink preamble modulated, a correlation value lower than said predefined threshold is obtained, said packet is considered not to have been transmitted in the context of an uplink communication.

According to one embodiment, when the control station considers that a modulated data packet received has been transmitted in the context of an uplink communication, the control station rejects said packet, and, when the control station considers that a modulated data packet received has been transmitted in the context of a downlink communication, said control station continues a procedure for receiving said packet comprising a demodulation of said packet.

According to one embodiment, when a pilotless mobile device considers that a modulated data packet received has been transmitted in the context of a downlink communication, said pilotless mobile device rejects said packet, and, when the pilotless mobile device considers that a modulated data packet received has been transmitted in the context of an uplink communication, the pilotless mobile device continues a procedure for receiving said packet comprising a demodulation of said packet.

According to one embodiment, the uplink preamble and the downlink preamble are pseudorandom binary sequences.

According to one embodiment, the convolution is implemented in the form of a finite impulse response filter.

According to a second aspect of the invention, the invention relates to a pilotless mobile device system comprising a control station and at least one pilotless mobile device, the control station communicating with each pilotless mobile device using a medium-access technique of the time division multiple access type in which each communication takes place in frames. Each frame is divided into a plurality of timeslots, each timeslot being divided into a plurality of burst intervals, each burst interval being divided into a plurality of periods making it possible to transmit data in the form of data packets, each data packet being modulated by a predefined modulation before transmission thereof, a first period in the plurality of periods making it possible to transmit a preamble enabling a receiver of said preamble to make a channel estimation in order to perform frequency, phase and timing synchronisations and reception signal equalisation, and a second period making it possible to transmit a burst. The system comprises: insertion means for inserting, in each data packet transmitted in the context of an uplink communication from the control station to a pilotless mobile device, a so-called uplink preamble orthogonal to the so-called downlink preamble, inserted in each data packet transmitted in the context of a downlink communication from a pilotless mobile device to the control station; and determination means for determining, when a modulated data packet is received, whether said packet was transmitted in the context of an uplink or downlink communication according to a result of a convolution between said packet with a reference preamble modulated according to the predefined modulation, said reference preamble corresponding to the uplink preamble or to the downlink preamble.

According to a third aspect of the invention, the invention relates to a computer program comprising instructions for the implementation, by a device, of the method according to the first aspect, when said program is executed by a processor of said device.

According to a fourth aspect of the invention, the invention relates to storage means storing a computer program comprising instructions for the implementation, by a device, of the method according to the first aspect, when said program is executed by a processor of said device.

The features of the invention mentioned above, as well as others, will emerge more clearly from a reading of the following description of an example embodiment, said description being given in relation to the accompanying drawings, among which.

The invention is described hereinafter in a context of a pilotless mobile device system comprising a control station and one to four drones. The pilotless mobile device system is therefore referred to hereinafter as a drone system. The invention does however apply in other contexts. For example, the invention could just as well apply to other pilotless mobile devices such as devices travelling on the ground or floating or submersible devices. Moreover, the invention could apply with a different number of drones and/or in a different number of control stations.

By extension, the invention applies to contexts other than that of pilotless mobile device systems. The invention can apply in networks using a medium-access technique of the time division multiple access type, which hereinafter we call a TDMA network in order to simplify. In this context the invention makes it possible to discriminate each of the uplinks and downlinks from each of the nodes in a TDMA network by means of modulated preamble sequences particular to each of the nodes and each of the uplinks and downlinks in the TDMA network.

Figure 1:
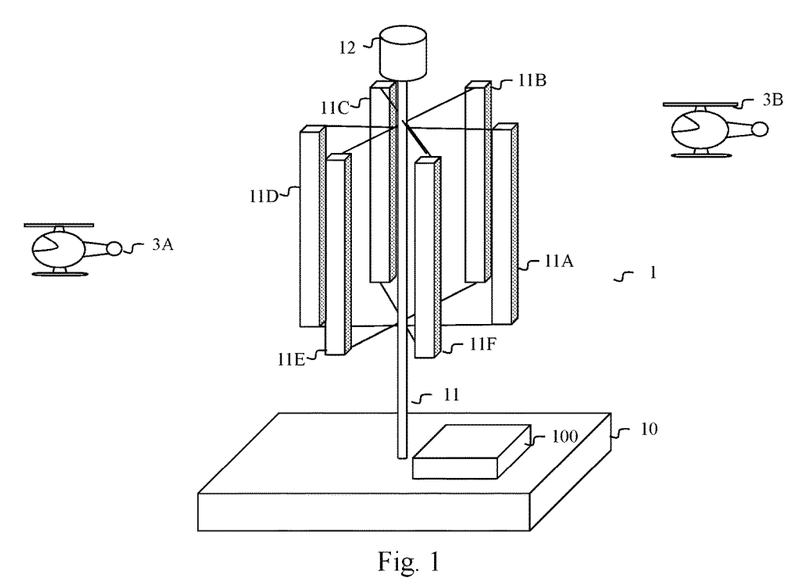
FIG. 1 illustrates schematically a pilotless mobile device system.

FIG. 1 illustrates schematically an example of a drone system.

In the example in FIG. 1, a drone system 1 comprises a control station 10 for simultaneously controlling drones 3A and 3B.

The control station 10 comprises an antenna system 11 comprising a plurality of antennas. The control station 10 comprises a processing module 100. The plurality of antennas comprises six sectoral antennas 11A, 11B, 11C, 11D, 11E and 11F and an omnidirectional antenna 12. Each sectoral antenna makes it possible to cover at −3 dB an azimuth of 60° and an elevation of +8°. The sectoral antennas each have a gain at +14 dBi. The omnidirectional antenna 12 makes it possible to cover at −3 dB an azimuth of 360° and from +8° to +90° in elevation with a gain ranging from +2.5 dBi to +6 dBi. The omnidirectional antenna 12 serves at a short distance for passages of drones above the antenna system 11 of the control station 10.

Each drone (3A or 3B) comprises an antenna system (not shown) comprising two omnidirectional antennas (not shown), one omnidirectional antenna for covering at −3 dB an azimuth of 360° and from 0° to +90° in elevation and one omnidirectional antenna for covering at −3 dB an azimuth of 360° and from 0° to −90° in elevation.

The drone system 1 described in relation to FIG. 1 forms a communication network in which the control station 10 communicates with the drones 3A and 3B. The control station 10 and the drones 3A and 3B use uplink communications for exchanging in particular command and control data in the direction from control station 10 to drone (3A or 3B) and downlink communications for exchanging useful data (for example observation data) in the direction from drone (3A or 3B) to control station 10.

In the drone system 1, the control station 10 and the drones 3A and 3B use a medium-access technique of the TDMA type. TDMA divides the time into a plurality of hierarchical levels of time divisions that we describe hereinafter in relation to FIG. 5. This medium-access technique requires time synchronisation at each node in the communication network (i.e. at the control station 10 and the drones 3A and 3B) in order to avoid any overlap in time. The communication network in FIG. 1 uses a centralised topology in which the control station 10 acts as a master node, that is to say the control station 10 times the whole of the network. The other nodes (i.e. the drones 3A and 3B) are slaves of the master node and set themselves timewise on a time reference given by the master node.

Figure 2:
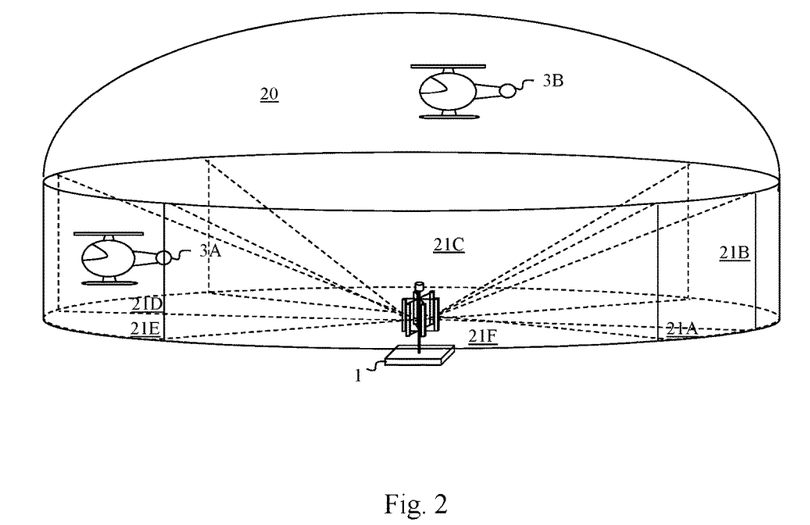
FIG. 2 illustrates schematically a range zone around an antenna system of a control station.

FIG. 2 illustrates schematically an example of a range zone around the antenna system 11 of the control station 10.

The range zone around the antenna system 11 can be seen schematically as a dome placed on a horizontal cylinder having the antenna system as its centre. This range zone comprises seven sectors. The six sectoral antennas 11A, 11B, 11C, 11D, 11E and 11F define respectively six sectors 21A, 21B, 21C, 21D, 21E and 21F. Each of the six sectors 21A, 21B, 21C, 21D, 21E and 21F has a semipyramidal form of azimuth 6° and +8° of elevation. All the pyramidal forms share the same vertex situated at the antenna system 11. The sectors 21A, 21B, 21C, 21D, 21E and 21F form a combined sector of 360° of azimuth and +8° of elevation fitting in the horizontal cylinder. The remaining part of the whole formed by the dome and the cylinder is the sector 20 covered by the omnidirectional antenna 12.

In the example in FIG. 2, the drone 3A is situated in the sector 21D covered by the antenna 11D and the drone 3B is situated in the sector 20 covered by the antenna 12. It will therefore be realised that, according to the position of a drone in the range zone of the antenna system 11, each antenna does not offer the same communication capability with said drone.

It should be noted that FIG. 2 shows a theoretical view of a division of a range zone into sectors and that in reality the range zone of an antenna is a transmission lobe having a non-zero intersection with transmission nodes of other antennas in the vicinity thereof.

Figure 3:
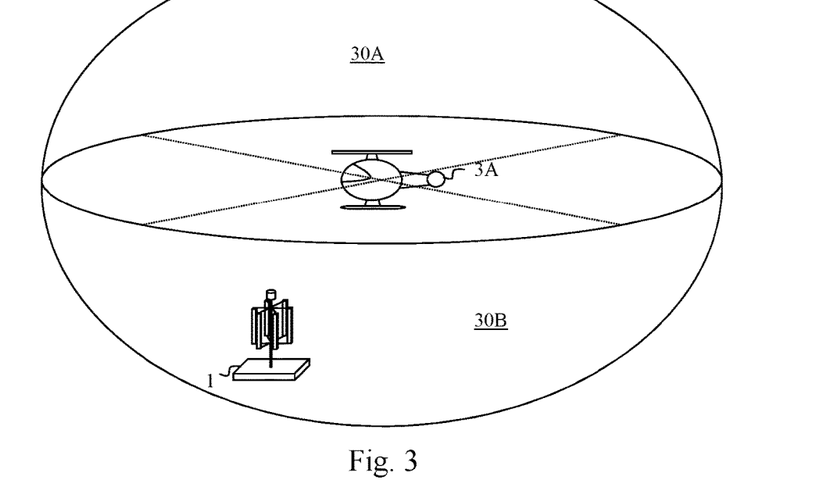
FIG. 3 illustrates schematically a range zone around an antenna system of a drone.

FIG. 3 illustrates schematically a range zone around an antenna system of a drone.

The range zone around the antenna system of a drone can be represented by a sphere. The omnidirectional antennas of the antenna system of each drone divide said sphere into two semihemispherical sectors (i.e. two hemispheres) 30A and 30B separated by a horizontal plane. In the example in FIG. 3, the antenna system 11 of the control station 10 is situated in the sector 3B.

In the drone system 1, a single antenna in the antenna system 11 and a single antenna of a drone transmit or receive at the same time. The procedure for selecting the antenna in the antenna system 11 is implemented periodically by the processing module 100 in order to determine which antenna offers the best quality of communication between the control station 10 and the drone 3A (or respectively the drone 3B) at a given instant. Likewise, a procedure for selecting a drone antenna is implemented periodically by a processing module 300 included in each drone (3A or 3B) in order to determine which antenna offers the best quality of communication between the control station 10 and said drone at a given instant.

Figure 4A:
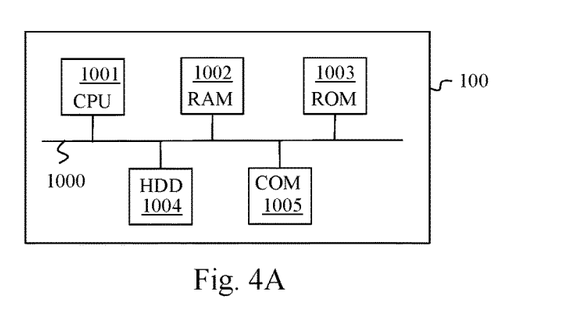
FIG. 4A illustrates schematically a processing module included in a control station.

FIG. 4A illustrates schematically an example of hardware architecture of the processing module 100 included in the control station 10.

According to the example of hardware architecture shown in FIG. 4A, the processing module 100 then comprises, connected by a communication bus 1000: a processor or CPU (central processing unit) 1001; a random access memory (RAM) 1002; a read only memory (ROM) 1003; a storage unit such as a hard disk or a storage medium reader, such as an SD (secure digital) card reader 1004; at least one communication interface 1005 enabling the processing module 100 to communicate with other modules or devices. For example, the communication interface 1005 enables the processing module 100 to communicate with other modules of the control station 10 such as an antenna-switching module for selecting an antenna to be used at a given instant or with other devices such as the drones 3A and 3B.

The processor 1001 is capable of executing instructions loaded in the RAM 1002 from the ROM 1003, from an external memory (not shown), from a storage medium (such as an SD card) or from a communication network. When the control module 10 is powered up, the processor 1001 is capable of reading instructions from the RAM 1002 and executing them. In one embodiment, these instructions form a computer program causing the implementation of communications between the base station 10 and each drone in the drone system 1 and of at least part of a method for distinguishing uplink and downlink communications.

Figure 4B:
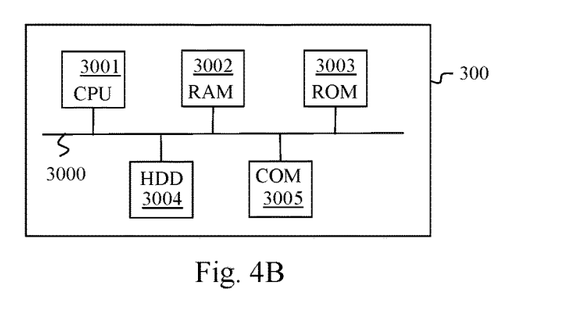
FIG. 4B illustrates schematically a processing module included in a drone.

FIG. 4B illustrates schematically an example of hardware architecture of a processing module 300 included in a drone such as the drone 3A or the drone 3B.

According to the example of hardware architecture shown in FIG. 4B, the processing module 300 then comprises, connected by a communication bus 3000: a processor or CPU (central processing unit) 3001; a random access memory (RAM) 3002; a read-only memory (ROM) 3003; a storage unit such as a hard disk or a storage medium reader, such as an SD (secure digital) card reader 3004; at least one communication interface 3005 enabling the processing module 300 to communicate with other modules or devices. For example, the communication interface 3005 enables the processing module 300 to communicate with other modules such as an antenna-switching module for selecting an antenna to be used at a given instant or to communicate with the control station 10.

The processor 3001 is capable of executing instructions loaded in the RAM 3002 from the ROM 3003, from an external memory (not shown), from a storage medium (such as an SD card) or from a communication network. When a drone (3A or 3B) is powered up, the processor 3001 is capable of reading instructions from the RAM 3002 and executing them. In one embodiment, these instructions form a computer program causing the implementation of communications between the drone comprising the processing module 300 and the control station 10 and at least part of a method for distinguishing uplink and downlink communications.

The methods implemented by the processing module 100 and the processing module 300 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 6:
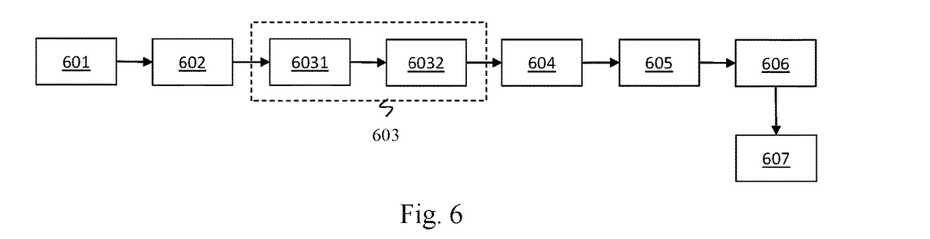
FIG. 6 illustrates schematically a transmission module according to the invention.

FIG. 6 illustrates schematically a transmission module according to the invention.

The communication interface 1005 of the control station 10 and the communication interface 3005 of each drone 3A and 3B each comprise a transmission module identical to the transmission module described in relation to FIG. 6.

The transmission module comprises:
- a multiplexing module 601;
- a module for forming data blocks (referred to as "bursts") 602;
- a channel coding module 603 comprising an LDPC (low density parity check) coding module 6031 and a BCH (Bose, Ray-Chaudhuri and Hocquenghem) coding module 6032;
- a baseband filtering module 604 such as a Gaussian filter;

an MSK (minimum shift keying) modulation module 605. The combination of the filtering module using a Gaussian filter and the MSK modulation module creates a GMSK (Gaussian minimum shift keying) modulation module;

a radio-frequency module 606 comprising a module for transposing from the baseband to the military frequency band [4.4 GHz; 4.9 GHz] or the civil band [5.031 GHz; 5.091 GHz], a high power amplification module (HPA), a transmission filter and a switch for selecting between the transmission module and a reception module.

an antenna system 607 corresponding to the antenna system 11 for the control station 10 or to the antenna system of the drone for the drone 3A and the drone 3B.

The modulation chosen (i.e. GMSK modulation) makes it possible to carry out channel coding of the convolutional type because of a memory effect introduced by the Gaussian filter. GMSK modulation is particularly suitable for achieving the bit rates required on each channel provided in the frequency band used (i.e. the military frequency band [4.4 GHz; 4.9 GHz] or the civil band [5.031 GHz; 5.091 GHz]).

As described above, the channel coding module 603 comprises two submodules: an LDPC coding module 6031 and a BCH coding module 6032.

In one embodiment, the LDPC coding module 6031 may be followed by a time interleaving module of the row/column type. The interleaving takes place on the useful data included in each time burst interval of a timeslot.

In one embodiment, the transmission module comprises a transmission security (TRANSEC) module using for example a frequency hopping technique (frequency hopping spread spectrum (FHSS)).

Figure 7:
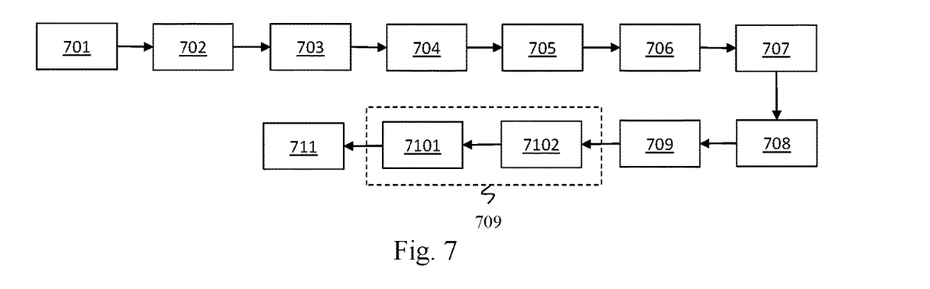
FIG. 7 illustrates schematically a reception module according to the invention.

FIG. 7 illustrates schematically a reception module. The communication interface 1005 of the control station 10 and the communication interface 3005 of each drone 3A and 3B each comprise a reception module identical to the reception module described in relation to FIG. 7.

The reception module comprises:
an antenna system 701 corresponding to the antenna system 11 for the control station 10 or to the antenna system of the drone for the drone 3A and the drone 3B. It should be noted that, for the control station 10 and each drone, the antenna systems 607 and 701 are in reality one and the same transmission and reception antenna system;

a reception filter 702 for selecting a frequency band. This reception filter makes it possible for example to select the military frequency band [4.4 GHz; 4.9 GHz] or the civil band [5.031 GHz; 5.091 GHz];

a low-noise amplifier (LNA) 703;

a module 704 for frequency transposition from the military frequency band [4.4 GHz; 4.9 GHz] or the civil band [5.031 GHz; 5.091 GHz] to the baseband;

a baseband filtering module 705 providing baseband selectivity;

a baseband signal equalisation module 706 making it possible to be partly free from multipath phenomena;

a convolution module 707 used for distinguishing the uplink communications and the downlink communications in accordance with a method that we describe hereinafter;

a frequency and phase synchronisation module 708;

a GMSK demodulation module 709;

a BCH decoding module 7101;

an LDPC decoding module 7102;

a module for demultiplexing the data streams 711.

It should be noted that when, in the transmission module, the LDPC coding module 6031 is followed by a time interleaving module of the row/column type, the LDPC decoding module 7092 is preceded by a time deinterleaving module of the row/column type.

Moreover, when the transmission module comprises a transmission security (TRANSEC) module, the reception module comprises a reciprocal transmission security module.

Figure 5:
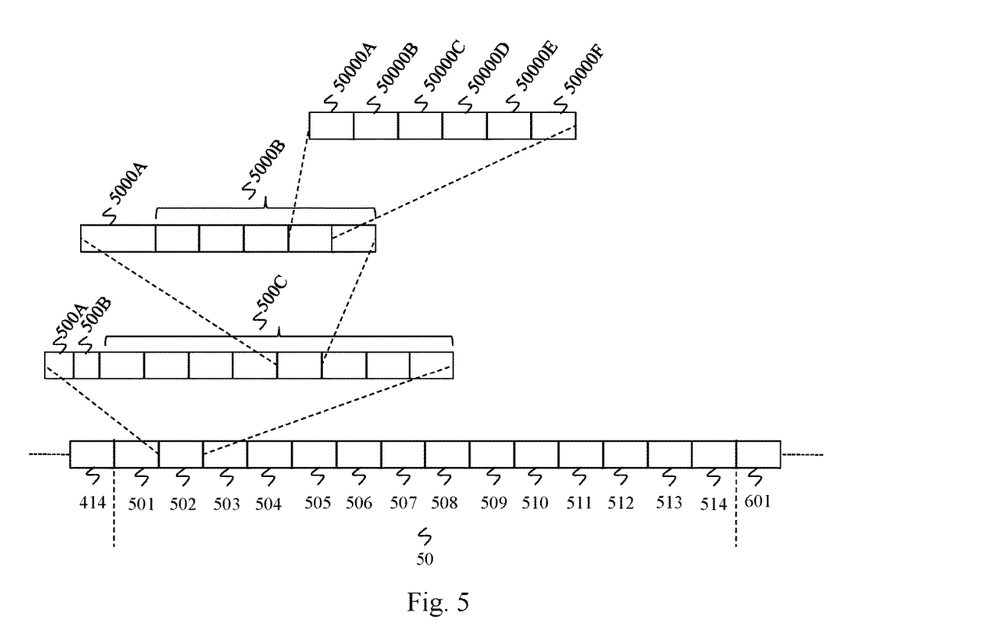
FIG. 5 illustrates schematically a medium-access technique according to the invention, of the time division multiple access type, dividing the time into a plurality of hierarchical levels of time divisions.

FIG. 5 illustrates schematically a medium-access technique according to the invention, of the time division multiple access type dividing the time into a plurality of hierarchical time division levels.

TDMA divides the time into a first hierarchical level referred to as epoch (not shown in FIG. 5) for example with a duration of one second.

In the example of the drone system 1, an epoch is divided into 5 frames, for example with a duration of 200 ms. A frame duration of 200 ms makes it possible to have a latency time in a communication between a drone and the control station 10 compatible with a transmission of conversation audio data.

In addition to being organised in epochs, the frames used in the drone system 1 are organised in a succession of groups of consecutive frames. A group of frames 50 is shown in FIG. 5. The group of frames 50 comprises a number of frames equal to the number of antennas of the antenna system 11 of the control station (i.e. seven) multiplied by the number of drones in activity in the drone system 1 (i.e. two drones). There are therefore as many frames in a group of frames as there are possible pairs formed by an antenna of the antenna system 11 and a drone. The group of frames 50 therefore comprises fourteen frames 501 to 514. A frame 414 belongs to a group of fourteen frames preceding the group of frames 50 and a frame 601 belonging to a group of fourteen frames following the group of frames 50. We shall see hereinafter that the organisation in groups of frames makes it possible to define in the drone system 1 which antenna of the antenna system 11 must transmit a signal to a given drone and thus to implement a procedure of selection of the antenna offering the best transmission quality between the control station 10 and said drone.

FIG. 5 gives a detail of the frame 502 included in the group of frames 50, all the frames used in the drone system 1 having an identical frame structure. The frame 502 is divided into a plurality of timeslots. The plurality of timeslots comprises a first timeslot 500A enabling the control station 10 to transmit a first signal known as a beacon enabling each zone to synchronise itself on a time reference given by the control station 10. It is by means of this beacon that the drones in the drone system 1 can synchronise themselves with the control station 10. Moreover, as we describe hereinafter, the position of the frame in the group of frames indicates for which drone the beacon is intended. It is therefore considered that the first signal designates a drone among the drones of the drone system 1.

The plurality of timeslots also comprises a second timeslot 500B enabling the drone designated by the first signal to transmit a second signal thus enabling it to acknowledge its presence in the drone system 1.

The timeslots 500A and 500B are followed by a succession of timeslots 500C. The succession of timeslots 500C comprises a number of timeslots dependent on the maximum number of drones that can be controlled in the drone system 1 (i.e. four drones). In the TDMA used in the drone system 1, each drone potentially able to be controlled is associated with two consecutive timeslots in the succession of timeslots: a timeslot during which the drone can receive data coming from the control station 10 and a timeslot during which the drone can transmit data in the direction of the control station 10. Each drone and the control station 10 share information describing an allocation of the timeslots 500A, 500B and of the succession of timeslots 500C in a frame. In the example described in relation to FIG. 5, the succession of timeslots comprises eight timeslots. The communication system of the drone system 1 can therefore manage up to four drones simultaneously.

The information describing the allocation takes the form of an allocation table shared by all the nodes in the network. This allocation table may be fixed or be updated synchronously in all the nodes in the network in order for example to take into account stoppages of drones or arrivals of new drones in the drone system 1.

At least one allocation table is transmitted during each frame in the timeslot 500A. Thus each node receiving an allocation table during a frame knows the allocation of the timeslots in said frame. Using this allocation table each drone knows in which timeslot of the frame it must transmit to the control station 10 and in which timeslot of the frame it can receive data from the control station 10. Likewise, the control station 10 knows in which timeslot it can send data to a given drone and in which timeslot of a frame it can receive data from the given drone. For example, in FIG. 5, the succession of timeslots 500C comprises a first timeslot used for communicating from the control station 10 to the drone 3A, a second timeslot used for communicating from the drone 3A to the control station 10, a third timeslot used for communicating from the control station 10 to the drone 3B and a fourth timeslot used for communicating from the drone 3B to the control station 10. The last four timeslots are left free, for example for any two other drones.

Each timeslot has for example a duration of 20 ms corresponding to a division of a frame into ten timeslots. A timeslot of 20 ms makes it possible to contain a complete LDPC block, which makes it possible to limit transmission latencies of each of the nodes.

FIG. 5 also gives a detail of a timeslot of the frame 502, each timeslot of the frame having an identical structure. A timeslot of a frame comprises a burst interval 5000A making it possible to take into account propagation times in the drone system 1, and a set of burst intervals 5000B during which the bursts are transmitted. The propagation time for reaching one of the drones 3A or 3B from the control station 10 at a typical maximum distance of 200 km for radio signals used in the military frequency band [4.4 GHz; 4.9 GHz] or civil band [5.031 GHz; 5.091 GHz] is around 0.8 ms. In the drone system 1, each timeslot comprises a set of five burst intervals 5000B. Consequently each burst interval has a duration of 3.84 ms. A duration of burst interval of 3.84 ms makes it possible to obtain a channel considered to be stationary during the duration of a burst interval.

FIG. 5 moreover gives a detail of a burst interval of a timeslot of a frame, each burst interval having an identical structure. Each burst interval comprises a period 50000A referred to as a burst guard time, a period 50000B referred to as high-power amplifier (HPA) ramping and a period 50000F referred to as high-power amplifier (HPA) ramping off intended to take into account reaction times of electronic components of a drone 3A or 3B or of the control station 10. A period 50000C (referred to as a sequence preamble) is used for transmitting a preamble enabling the receiving node to make an estimation of the channel in order to perform frequency, phase and timing synchronisations and reception signal equalisations. These synchronisations make it possible to synchronise readings of samples following the period 50000C in the burst interval. Furthermore, as we shall see hereinafter, this preamble is used to identify the uplink communications as opposed to the downlink communications. A period 50000D (referred to as selection mode) makes it possible to transmit information representing a burst interval number in order to ensure time synchronisation of each of the drones on the control station. Moreover, this burst interval number enables each of the nodes to determine whether said burst interval is relevant to it for sending or receiving data. The data representing the burst interval number that are transmitted during the period 50000D are encoded by the BCH coding module 6032 independently of all other data of the burst interval. A period 50000E (referred to as a burst) makes it possible to transmit useful data. The useful data transmitted during the period 50000E are encoded by the LDPC coding module 6031. The independent encoding of the data corresponding to the burst interval number makes it possible to decode these data without having to decode the useful data. In this way, on reception, a processing module (100 or 300) is capable of determining whether useful data transmitted in a burst are intended for it or not, without having to decode said useful data. The data transmitted in the periods 50000C, 50000D and 50000E form a data packet.

As seen above, each group of frames used in the drone system 1 is organised in a group structure associating each frame with a pair formed by an antenna of the control station 10 and of a drone, each possible pair being associated with a different frame according to the position of said frame in the group. For example, in FIG. 5, frames 501 to 507 are associated with the drone 3A and the frames 508 to 514 are associated with the drone 3B. The frame 501 is associated with the antenna 11A, the frame 502 is associated with the antenna 11B, the frame 503 is associated with the antenna 11C, the frame 504 is associated with the antenna 11D, the frame 505 is associated with the antenna 11E, the frame 506 is associated with the antenna 11F and the frame 507 is associated with the antenna 12. The frame 508 is associated with the antenna 11A, the frame 509 is associated with the antenna 11B, the frame 510 is associated with the antenna 11C, the frame 511 is associated with the antenna 11D, the frame 512 is associated with the antenna 11E, the frame 513 is associated with the antenna 11F, and the frame 514 is associated with the antenna 12.

Each node, knowing the duration of each frame and being synchronised with the control station 10, is capable of determining when a frame begins, even when it does not receive data for some frames. Moreover, from the information contained in each allocation table, each node is capable of determining the group structure. This is because, from the number of timeslots attributed in a frame, each node is capable of determining the number of drones active in the drone system 1. Since each drone knows the number of antennas in the antenna system 11, it is capable of determining the number of frames in a group of frames. In one embodiment, each node knows a group structure for each number of active drones possible in the drone system 1 (i.e. from 1 to 4 active drones). Moreover, in one embodiment, information representing a position of a frame in a group of frames is transmitted in the timeslot 500A of each frame. Thus, from the position of a current frame in a group of frames, each node is capable of determining which antenna in the control station 10 is transmitting a beacon and for which drone said beacon is intended. This information on the group structure among other things enables the processing module 100 of the control station 10 to implement an antenna selection method, enabling it to select, from the antennas in the antenna system 11, the antenna offering the best quality of communication with a given drone. This is because, taking the example in FIG. 5, for each beacon transmitted in the frames 501 to 507, the processing module 100 receives an acknowledgement signal from the drone 3A containing information representing a quality of reception of the beacon measured by the drone. Information representing a quality of reception is for example an RSSI (received signal strength indication) measurement measured when a beacon is received. From the information representing a quality of reception obtained, the processing module 100 determines which antenna is offering the best quality of communication and selects this antenna for a predetermined number of frames following the frame 507. For example, the processing module 100 selects an antenna for the drone 3A until the transmission of the next frame containing a beacon designating the drone 3A. In the example in FIG. 1 with two drones in the drone system 1, this amounts to selecting an antenna for seven frames. The processing module 100 does likewise for the drone 3B from the frames 508 to 514 in order to select the best antenna for communicating with the drone 3B.

In a conventional communication network of a drone system the uplink and downlink communications are distinguished after demodulation and channel decoding in the data link layer and/or the following layers of the OSI (open system interconnection) model. It is therefore necessary to demodulate and decode each signal received in order to determine whether it is an uplink or a downlink.

In order to avoid these demodulations and channel decodings, the drone system 1 uses, in each uplink communication, a preamble, referred to as the uplink preamble, orthogonal to the so-called downlink preamble, used in each downlink communication.

Figure 8:
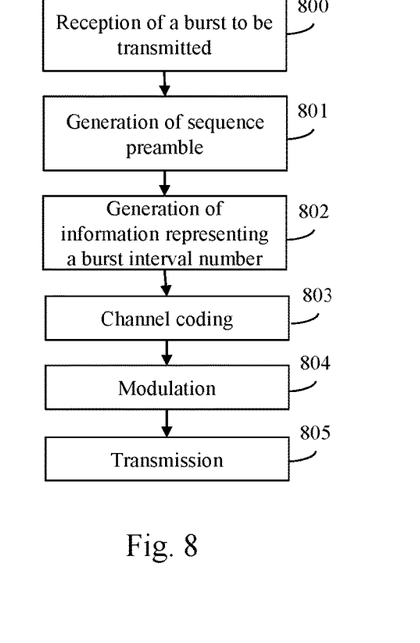
FIG. 8 illustrates schematically a method for transmitting a data packet according to the invention.

FIG. 8 illustrates schematically a method for transmitting a data packet according to the invention.

The method described in relation to FIG. 8 is implemented at each transmission of a data packet by the transmission module included in the communication interface 1005 of the control station 10 or the communication interface 3005 of each drone 3A and 3B. This method is implemented by the processing module 100 or 300 using the modules constituting the transmission module.

In a step 800, the processing module 100 (or respectively 300) detects the reception of a burst to be transmitted by the transmission module.

In a step 801, the processing module 100 (or respectively 300) uses the burst formation module 602 to generate an uplink preamble (or respectively a downlink preamble). In one embodiment, the burst formation module 602 of the control station 10 (or respectively of the drone 3A or drone 3B) generates the same preamble for each data packet. On the other hand, the burst formation module 602 of the control station 10 generates uplink preambles orthogonal to the downlink preambles generated by the burst formation module 602 of the drones 3A and 3B.

The uplink preamble and the downlink preamble are pseudorandom binary sequences having good autocorrelation properties.

An example of a pseudorandom binary sequence $S_{bin}^{mont}$ that can serve as a preamble for uplink communications is as follows:

$S_{bin}^{mont}$=0 0 1 0 0 1 0 1 1 1 0 0 0 0 1 0 0 0 1 0 0 1 0 1 1 1 0 0 1 0 1 1 0 1 1 1 0 1 1 1 1 0 0 0 1 0 1 1 0 1

An example of a pseudorandom binary sequence $S_{bin}^{desc}$ that can serve as a preamble for downlink communications is as follows:

$S_{bin}^{desc}$=0 1 0 0 0 0 1 1 1 0 1 1 1 0 1 0 0 1 0 0 0 0 1 1 1 0 0 1 0 0 0 1 1 1 1 0 1 1 0 1 0 0 0 1 0 0 0 1 1 1

In a step 802, the burst formation module 602 generates information representing a burst interval number intended to be transmitted in a period 50000D.

In a step 803, a channel coding is applied to the information representing a burst interval number and to the burst to be transmitted. In more detail, a BCH coding is applied by the BCH coding module 6032 to the information representing the burst interval number and an LDPC coding is applied by the LDPC coding module 6031 to the burst.

In a step 804, a data packet is formed comprising the preamble, the information representing an encoded burst interval number and the encoded burst. The packet thus formed is then modulated by the GMSK modulation module (i.e. the Gaussian filtering module 604 and the MSK modulation module 605).

During a step 805, the data packet is transmitted.

Figure 9:
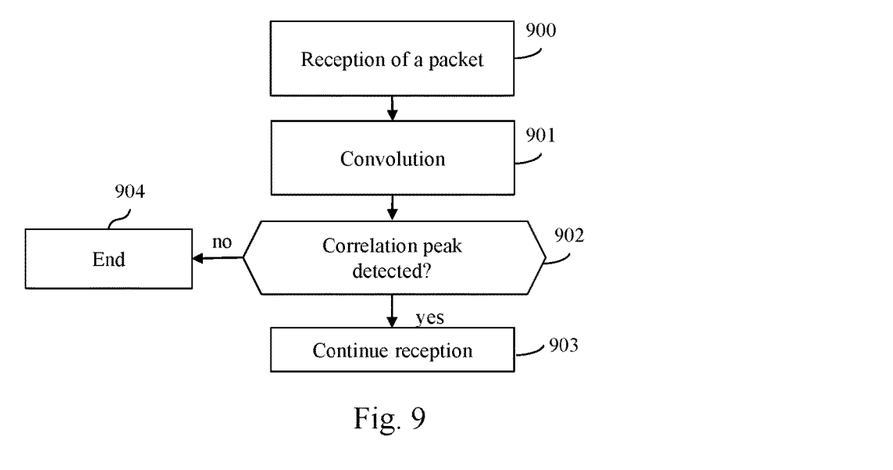
FIG. 9 illustrates schematically a method for receiving a data packet according to the invention.

FIG. 9 illustrates schematically a method for receiving a data packet according to the invention.

The method described in relation to FIG. 9 is implemented at each reception of a data packet by the reception module included in the communication interface 1005 of the control station 10 (or respectively the communication interface 3005 of each drone 3A and 3B). This method is implemented by the processing module 100 (or respectively the processing module 300) using the modules constituting the reception module.

On reception of a data packet, the processing module 100 (or respectively the processing module 300) determines when a said packet has been transmitted in the context of an uplink or downlink communication according to a result of a convolution between said modulated data packet received with a reference preamble modulated in accordance with GMSK modulation, said reference preamble corresponding to the uplink preamble or to the downlink preamble depending on whether the method is implemented by the processing module 100 of the control station or the processing module 300 of a drone 3A or 3B.

In a step 900, the reception module receives a modulated data packet.

In a step 901, the processing module 100 (or respectively 300) applies a convolution to the modulated data packet received using the convolution module 707. The convolution step 901 is implemented prior to the synchronisation by the frequency and phase synchronisation module 708 and prior to the demodulation by the GMSK demodulation module 709. During step 901, the processing module 100 (or respectively 300) applies a convolution between the modulated data packet received and a reference modulated preamble stored in memory. The reference modulated preamble is for example stored in the storage unit 1004 of the processing module 100 (or respectively in the storage unit 3004 of the processing module 300). The reference modulated preamble corresponds to a downlink preamble for the control station 10 (or respectively corresponds to an uplink preamble for the drone 3A or 3B).

In a step 902, the processing module checks a result of the convolution. When, on reception of a modulated data packet, the convolution between said modulated packet received and the reference modulated preamble, no correlation is detected (i.e. the convolution between said modulated packet and the modulated reference preamble does not make it possible to observe a correlation peak) the processing module 100 (or respectively 300) deduces from this that the preamble included in said packet is orthogonal to the preamble sought and therefore that said packet is not intended for it. The data packet is then rejected. Conversely, when, on reception of a modulated data packet, the convolution between said modulated packet and the reference modulated packet, a correlation is detected (i.e. the convolution between said modulated packet and the modulated preamble stored in memory makes it possible to observe a correlation peak), the processing module (100 or 300) deduces from this that the data packet is intended for it.

In one embodiment, the convolution is implemented in the form of a finite impulse response filter (FIR filter).

It should be noted that a correlation peak is considered to be observed when, during a convolution calculation by the convolution module 707, a correlation value greater than or equal to a predefined correlation threshold is obtained.

When a correlation peak is observed, the processing module 100 (or respectively the processing module 300) continues the reception process by implementing a synchronisation step by the frequency and phase synchronisation module 708, and then proceeding with the demodulation of the packet by the demodulation module 709 during a step 903. Otherwise, in a step 904, the processing module 100 (or respectively 300) rejects the packet without applying any additional processing. In other words, when the processing module 100 of the control station 10 considers that the data packet has been transmitted in the context of an uplink communication, it rejects said packet. When the processing module 100 of the control station 10 considers that the data packet has been transmitted in the context of a downlink communication, it continues the packet reception procedure and applies in particular a demodulation to said data packet. When the processing module 300 of the drone 3A (or 3B) considers that the data packet has been transmitted in the context of a downlink communication, it rejects said packet. When the processing module 300 of the drone 3A (or 3B) considers that the data packet has been transmitted in the context of an uplink communication, it continues the packet reception procedure and applies in particular a demodulation to said data packet.

The invention claimed is:

1. A method implemented in a pilotless mobile device system comprising a control station and at least one pilotless mobile device, the control station communicating with each pilotless mobile device using a medium-access technique of the time division multiple access type in which each communication takes place in frames, wherein:

each frame is divided into a plurality of timeslots, each timeslot being divided into a plurality of burst intervals, each burst interval being divided into a plurality of periods allowing to transmit data in the form of data packets, each data packet being modulated by a predefined modulation before transmission thereof, a first period in the plurality of periods allowing to transmit a preamble enabling a receiver of said preamble to make a channel estimation in order to perform frequency, phase and timing synchronisations and reception signal equalisations, and a second period allowing to transmit a burst;

the method comprising:

using, in each uplink communication from the control station to a pilotless mobile device, a preamble, referred to as the uplink preamble, orthogonal to the preamble known as the downlink preamble used in each downlink communication from a pilotless mobile device to the control station; and when a modulated data packet is received, determining whether said modulated data packet has been transmitted in the context of an uplink or downlink communication according to a result of a convolution between said modulated data packet with a reference preamble modulated according to the predefined modulation, said reference preamble corresponding to the uplink preamble or to the downlink preamble.

2. The method according to claim 1, wherein when, during a convolution calculation between said modulated data packet and the modulated downlink preamble, a correlation value greater than or equal to a first predefined threshold is obtained, said modulated data packet is considered to have been transmitted in the context of a downlink communication and, when, during a convolution calculation between said modulated data packet and the modulated uplink preamble, a correlation value greater than or equal to a second predefined threshold is obtained, said modulated data packet is considered to have been transmitted in the context of an uplink communication.

3. The method according to claim 2, wherein when, during a convolution calculation between said modulated data packet and the modulated downlink preamble, a correlation value lower than the first predefined threshold is obtained, said modulated data packet is considered not to have been transmitted in the context of a downlink communication and, when, during a convolution calculation between said modulated data packet and the modulated uplink preamble, a correlation value lower than said predefined threshold is obtained, said modulated data packet is considered not to have been transmitted in the context of an uplink communication.

4. The method according to claim 2, wherein when the control station considers that a modulated data packet received has been transmitted in the context of an uplink communication, the control station rejects said modulated data packet, and, when the control station considers that a modulated data packet received has been transmitted in the context of a downlink communication, the control station continues a procedure for receiving said modulated data packet comprising a demodulation of said modulated data packet.

5. The method according to claim 2, wherein when a pilotless mobile device considers that a modulated data packet received has been transmitted in the context of a downlink communication, said pilotless mobile device rejects said modulated data packet, and, when the pilotless mobile device considers that a modulated data packet received has been transmitted in the context of an uplink communication, the pilotless mobile device continues a procedure for receiving said packet comprising a demodulation of said modulated data packet.

6. The method according to claim 1, wherein the uplink preamble and the downlink preamble are pseudorandom binary sequences.

7. The method according to claim 1, wherein the convolution is implemented in the form of a finite impulse response filter.

8. Non transitory storage medium, that stores a computer program comprising program code instructions which can be loaded in a programmable device to cause said programmable device to implement the method according claim 1, when said program code instructions are executed by the programmable device.

9. A pilotless mobile device system comprising a control station and at least one pilotless mobile device, the control station communicating with each drone using a medium-access technique of the time division multiple access type in which each communication takes place in frames, wherein:
> each frame is divided into a plurality of timeslots, each timeslot being divided into a plurality of burst intervals, each burst interval being divided into a plurality of periods allowing to transmit data in the form of data packets, each data packet being modulated by a predefined modulation before transmission thereof, a first period in the plurality of periods allowing to transmit a preamble enabling a receiver of said preamble to make a channel estimation in order to perform frequency, phase and timing synchronisations and reception signal equalisations, and a second period allowing to transmit a burst;
>
> and wherein the pilotless mobile device system comprises:
>
> insertion means for inserting, in each data packet transmitted in the context of an uplink communication from the control station to a pilotless mobile device, a so-called uplink preamble orthogonal to the so-called downlink preamble, inserted in each data packet transmitted in the context of a downlink communication from a pilotless mobile device to the control station; and
>
> determination means for determining, when a modulated data packet is received, whether said modulated data packet was transmitted in the context of an uplink or downlink communication according to a result of a convolution between said modulated data packet with a reference preamble modulated according to the predefined modulation, said reference preamble corresponding to the uplink preamble or to the downlink preamble.

\* \* \* \* \*